United States Patent
Faber et al.

(10) Patent No.: US 12,486,349 B2
(45) Date of Patent: Dec. 2, 2025

(54) CURABLE COMPOSITIONS

(71) Applicant: PPG Industries Ohio, Inc., Cleveland, OH (US)

(72) Inventors: Matthew S. Faber, Gibsonia, PA (US); Elizabeth A. Horner, Johnstown, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 587 days.

(21) Appl. No.: 17/756,865

(22) PCT Filed: Dec. 3, 2020

(86) PCT No.: PCT/US2020/062983
§ 371 (c)(1),
(2) Date: Jun. 3, 2022

(87) PCT Pub. No.: WO2021/113430
PCT Pub. Date: Jun. 10, 2021

(65) Prior Publication Data
US 2023/0087427 A1 Mar. 23, 2023

Related U.S. Application Data

(60) Provisional application No. 62/943,962, filed on Dec. 5, 2019.

(51) Int. Cl.
C09D 183/00 (2006.01)
C08F 283/12 (2006.01)
C09D 183/06 (2006.01)

(52) U.S. Cl.
CPC ........ *C08F 283/122* (2013.01); *C09D 183/06* (2013.01)

(58) Field of Classification Search
CPC ........................ C08F 283/122; C09D 183/06
USPC ...................................................... 106/287.1
See application file for complete search history.

(56) References Cited

U.S. PATENT DOCUMENTS

| 4,000,115 A | 12/1976 | Jacobs |
| 4,058,401 A | 11/1977 | Crivello |
| 4,069,055 A | 1/1978 | Crivello |
| 4,101,513 A | 7/1978 | Fox et al. |
| 4,161,478 A | 7/1979 | Crivello |
| 4,360,653 A | 11/1982 | Stevens |
| 4,994,208 A | 2/1991 | McBain |

(Continued)

FOREIGN PATENT DOCUMENTS

| CA | 2727618 A1 | 12/2009 |
| EP | 2001966 B1 | 12/2008 |
| JP | 2009285978 A | 12/2009 |

OTHER PUBLICATIONS

International Search Report and Written Opinion received for PCT Application Serial No. PCT/US2020/062983 dated Mar. 11, 2021, 8 pages.

*Primary Examiner* — James E McDonough
(74) *Attorney, Agent, or Firm* — Krisanne Shideler (57) ABSTRACT

Provided is a curable composition including the following components: (i) a first alkoxysilane which is unhydrolyzed; (ii) a second alkoxysilane which is 5 to 45 percent hydrolyzed; and (iii) an ethylenically unsaturated monomer. The invention also provides coatings formed from the curable composition and articles coated with the curable composition.

13 Claims, 3 Drawing Sheets

(56) References Cited

U.S. PATENT DOCUMENTS

| | | |
|---|---|---|
| 5,200,483 A | 4/1993 | Selvig |
| 5,373,033 A | 12/1994 | Toh et al. |
| 5,475,074 A | 12/1995 | Matsuoka et al. |
| 5,668,210 A * | 9/1997 | Harris .................. C09D 183/08 |
| | | 524/588 |
| 5,753,146 A | 5/1998 | Van Gemert et al. |
| 5,907,000 A | 5/1999 | Treadway |
| 6,100,313 A | 8/2000 | Treadway |
| 6,514,574 B1 | 2/2003 | Valeri et al. |
| 6,780,232 B2 | 8/2004 | Treadway |
| 7,384,695 B2 | 6/2008 | Treadway |
| 7,514,482 B2 | 4/2009 | Treadway |
| 7,723,404 B2 | 5/2010 | Cheng |
| 7,981,514 B2 | 7/2011 | Treadway |
| 9,557,449 B2 | 1/2017 | Valeri |
| 2014/0057115 A1 | 2/2014 | Treadway |
| 2016/0237312 A1 | 8/2016 | Treadway |
| 2016/0272841 A1* | 9/2016 | Litman .................... C08J 7/123 |
| 2018/0003861 A1 | 1/2018 | Valeri |
| 2018/0113239 A1* | 4/2018 | Valeri ..................... C08L 75/04 |

* cited by examiner

CURABLE COMPOSITIONS

CROSS REFERENCE TO RELATED APPLICATION

This application is the United States national phase of International Application No. PCT/US2020/062983 filed Dec. 3, 2020, which claims priority to U.S. Application No. 62/943,962, filed Dec. 5, 2019, the disclosures of which are hereby incorporated by reference in their entireties.

FIELD OF THE INVENTION

This invention relates generally to curable compositions which are particularly well suited as coatings for optical articles.

BACKGROUND OF THE INVENTION

Technical Considerations

Radiation-curable hard coating products, such as those curable by exposure to ultraviolet radiation, are widely used in the prescription laboratory segment of the optical market to protect the surfaced side of a semi-finished lens that has been processed to achieve the prescribed power and configuration for the end user. To achieve hard coating adhesion to various ophthalmic lens materials common in the industry, epoxy-functional alkoxysilanes are well-known and widely used. However, these epoxy-functional alkoxysilanes are typically fully or partially hydrolyzed to enable the formation of condensed oligomers.

Published prior art describes compositions where the level of unhydrolyzed epoxy-functional alkoxysilane must be below 50 weight percent on total formula weight to achieve acceptable performance. U.S. Pat. No. 6,780,232 teaches hydrolysis of the epoxy-functional alkoxysilane in an acidic environment. Hydrolysis of the alkoxy groups liberates the associated alcohol to form silanol groups, which are relatively unstable and tend to condense spontaneously. In this example, the alkoxysilane is reacted with a stoichiometrically sufficient quantity of water to hydrolyze at least 50% of the alkoxy groups. The solution is mixed for at least 16 hours. Self-condensation of the hydrolyzed alkoxysilane species yields a mixture of primarily oligomeric and polymeric products.

Surprisingly, it has been found that by hydrolyzing less than 50 percent of the hydrolyzable groups under conditions that discourage spontaneous condensation, curable compositions providing improved properties can be achieved.

SUMMARY OF THE INVENTION

The present invention provides a curable composition comprising the following components:
(i) a first alkoxysilane which is unhydrolyzed;
(ii) a second alkoxysilane which is 5 to 45 percent hydrolyzed;
and
(iii) an ethylenically unsaturated monomer.

The invention also is directed to coatings formed from the curable composition as well as articles comprising a substrate and a coating formed from the curable composition.

DESCRIPTION OF THE INVENTION

All numbers used in the specification and claims are to be understood as being modified in all instances by the term "about". All ranges disclosed herein are to be understood to encompass the beginning and ending range values and any and all subranges subsumed therein. The ranges set forth herein represent the average values over the specified range.

The terms "polymer" or "polymeric" include oligomers, homopolymers, copolymers, and terpolymers. For purposes of the present invention, the term "monomeric" in the context of alkoxysilane means that the alkoxysilane or hydrolyzed (silanol) group(s) thereof remains uncondensed or non-condensed.

By "unhydrolyzed" means a percent hydrolysis of hydrolyzable groups of less than 5 percent, such as less than 3 percent, such as less than 1 percent, such as 0 percent. For example, during the preparation of component (i), it is preferred that no water is deliberately added to hydrolyze component (i).

The invention comprises, consists of, or consists essentially of the following aspects of the invention, in any combination.

The invention relates to curable compositions, such as are thermally and/or radiation curable coating compositions, that are well-suited for optical articles.

The present invention provides a curable composition comprising the following components:
(i) a first alkoxysilane which is unhydrolyzed;
(ii) a second alkoxysilane which is 5 to 45 percent hydrolyzed; and
(iii) an ethylenically unsaturated monomer.

The first alkoxysilane and the second alkoxysilane can be the same or different. Also, it should be mentioned that component (i) can comprise two or more "first" alkoxysilanes which are unhydrolyzed. Likewise, component (ii) can comprise two or more "second" alkoxysilanes provided that 5 to 45 percent of the hydrolyzable groups present are hydrolyzed. That is, the "second" alkoxysilane(s) present in component (ii) are reacted with a sufficient amount of water to effect hydrolysis of 5 to 45 percent, such as 10 to 40 percent, of the alkoxy groups present in component (ii).

Further, it should be noted that component (i) and component (ii) are prepared and added to the composition separately, i.e., as separate components.

Component (ii) of the curable composition also comprises at least 30 percent monomeric alkoxysilane. For example, component (ii) of the curable composition can comprise 30 to 100 percent monomeric alkoxysilane, such as 30 to 95 percent, or 35 to 90 percent monomeric alkoxysilane, where percentages are based on total weight of component (ii).

The first alkoxysilane(s) and the second alkoxysilane(s) present in the curable composition each independently can have the following structure (I):

$$R_xSi(OR')_{4-x} \qquad (I)$$

wherein x is 0, 1, 2, or 3; R is an organic radical independently selected from the group consisting of $C_1$ to $C_6$ alkyl, vinyl, methoxyalkyl, phenyl, γ-glycidoxy alkyl, and γ-methacryloxy alkyl; and each R' is independently a $C_1$ to $C_4$ alkyl group, or, in some instances, an aryl group.

Examples of suitable alkoxysilanes can include, but are not limited to, methyl triethoxysilane, 3-glycidoxypropyl trimethoxysilane, tetramethoxysilane, tetraethoxysilane, and acryloxysilane.

The partial hydrolysis can be effected by adding a stoichiometrically sufficient amount of water to hydrolyze the targeted percentage of the hydrolyzable groups (e.g., alkoxy groups), such as 5 to 45 percent of the hydrolysable groups. To accelerate the hydrolysis reaction, an acidic or basic catalyst may be used. Hydrolysis of alkoxysilanes produces silanol groups, which can spontaneously condense to form siloxane oligomers. By performing the partial hydrolysis reaction at low temperatures, such as temperatures between 0° C. to 20° C., for a period of time less than or equal to 120 minutes, the amount of spontaneous condensation may be minimized. An exotherm may occur during this time. Alcohol species liberated through the hydrolysis of alkoxy groups and, optionally, water may be removed from the hydrolysis product under vacuum conditions. The relative amount of monomeric (i.e., non-condensed) material may be measured by gel permeation chromatography ("GPC"), as described herein. For purposes of the present invention, the amount of monomeric alkoxysilane material remaining after hydrolysis may be at least 30 percent based on the product mixture. Higher stoichiometric amounts of water may be considered to hydrolyze, for example up to 50 percent, or up to 60 percent, or up to 70 percent of the hydrolyzable groups, provided the reaction conditions are such that the resultant product mixture comprises the requisite amount of monomeric alkoxysilane.

The curable composition of the present invention also comprises component (iii) which comprises an ethylenically unsaturated monomer. A wide variety of ethylenically unsaturated monomers (including oligomers) can be employed in the curable composition of the invention. Useful ethylenically unsaturated compounds include both mono- and di-functional ethylenically unsaturated monomers, but other or additional polyfunctional ethylenically unsaturated monomers also may be included. For purposes of the present invention, suitable ethylenically unsaturated monomers also can include vinyl monomers as described herein below.

Examples of polyfunctional ethylenically unsaturated monomers, including di-, tri-, and tetrafunctional monomers, including neopentylglycol diacrylate, pentaerythritol triacrylate, 1,6-hexanediol diacrylate, trimethylolpropane triacrylate, tetraethylene glycol diacrylate, 1,3-butylene glycol diacrylate, trimethylolpropane trimethacrylate, 1,3-butylene glycol dimethacrylate, ethylene glycol dimethacrylate, pentaerythritol tetraacrylate, tetraethylene glycol dimethacrylate, 1,6-hexanediol dimethacrylate, ethylene glycol diacrylate, diethylene glycol diacrylate, glycerol diacrylate, glycerol triacrylate, 1,3-propanediol diacrylate, 1,3-propanediol dimethacrylate, 1,2,4-butanetriol trimethacrylate, 1,4-cyclohexanediol diacrylate, 1,4-cyclohexanediol dimethacrylate, pentaerythritol diacrylate, 1,5-pentanediol dimethacrylate, and the like.

Examples of suitable vinyl monomers can include vinyl aromatic compounds such as styrene or vinyl toluene; vinyl or vinylidene halides such as vinyl chloride or vinylidene fluoride, vinyl ethers such as 1,4-butanediol divinyl ether or cyclohexane dimethanol divinyl ether, or vinyl esters such as vinyl acetate.

The ethylenically unsaturated monomer of component (iii) can be selected from the group consisting of hexanediol diacrylate, butanediol diacrylate, cyclohexane dimethanol divinylether, and mixtures thereof.

Generally, component (i) is present in the curable composition in an amount ranging from 5 to 90 weight percent, such as 10 to 80 weight percent, or 25 to 70 weight percent component (ii) is present in the curable composition in an amount ranging from 5 to 90 weight percent, such as 10 to 70 weight percent, or 25 to 50 weight percent; and component (iii) is present in the curable composition in an amount ranging from 1 to 50 weight percent, such as 2 to 40 weight percent, or 5 to 25 weight percent, where weight percentages are based on the total combined weight of components (i), (ii), and (iii).

The curable compositions of the present invention can further comprise a free-radical initiator selected from the group consisting of thermal initiators, photoinitiators, and mixtures thereof. Examples of suitable thermal free-radical initiators include, but are not limited to, organic peroxides, such as peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate or diisopropylperoxydicarbonate; diacylperoxides, such as 2,4-dichlorobenzoyl peroxide, isoburyryl peroxide, decanoyl peroxide, lauroyl peroxide, propionyl peroxide, acetyl peroxide, benzoyl peroxide, or p-chlorobenzoyl peroxide; peroxyesters such as t-butylperoxy pivalate, t-butylperoxy octylate, or t-butylperoxyisobutyrate; methylethylketone peroxide, acetylcyclohexane sulfonyl peroxide, and mixtures thereof.

Examples of suitable photoinitiators can include, but are not limited to, the haloalkylated aromatic ketones, chloromethylbenzophenones, certain benzoin ethers, certain acetophenone derivatives such as diethoxyacetophenone or 2-hydroxy-2-methyl-1-phenylpropan-1-one. Additional examples of free-radical photoinitiators include the benzil ketals, which produce rapid cures. Also suitable as the photoinitiator are those sold under the product names IRGACURE™ and DAROCURE™, both available from BASF corporation. Non-limiting examples include Irgacure 651 (α,α-dimethoxy-α-phenyl acetophenone), and Darocure™ 1173 (2-hydroxy-2-methyl-1-phenylpropane-1-one). Specific examples of photoinitiators can include ethyl benzoin ether, isopropyl benzoin ether, dimethoxyphenyl acetophenone, diethoxy acetophenone, and benzophenone.

When an epoxy-functional alkoxysilane, e.g., 3-glycidoxypropyl trimethoxysilane, is used in the curable composition of the present invention (e.g., in component (i) and/or component (ii)), the composition can also include a curing agent comprising a cationic initiator. Such cationic initiators can include the aromatic onium salts, including salts of Group VA elements, such as phosphonium salts, e.g., triphenyl phenacylphosphonium hexafluorophosphate, salts of Group VIA elements, such as sulfonium salts, e.g., triphenylsulfonium tetrafluoroborate, triphenylsulfonium hexafluorophosphate and triphenylsulfonium hexafluoroantimonate, and salts of Group VIIA elements, such as iodonium salts such as diphenyliodonium chloride, and diaryl iodonium hexafluoroantimonate. The aromatic onium salts and their use as cationic initiators in the polymerization of epoxy compounds are described in detail in U.S. Pat. No. 4,058,401 at column 1, line 49 to column 5, line 17, "Photocurable Compositions Containing Group VIA Aromatic Onium Salts", by J. V. Crivello issued Nov. 15, 1977; U.S. Pat. No. 4,069,055, at column 1, line 48 to column 4, line 44, "Photocurable Epoxy Compositions Containing Group VA Onium Salts", by J. V. Crivello issued Jan. 17, 1978, U.S. Pat. No. 4,101,513 at column 3, line 51 to column 4, line 68, "Catalyst For Condensation Of Hydrolyzable Silanes And Storage Stable Compositions Thereof", by F. J. Fox et al. issued Jul. 18, 1978; and U.S. Pat. No. 4,161,478 at column 1, line 14 to column 9, line 68, "Photoinitiators", by J. V. Crivello issued Jul. 17, 1979, the specified disclosures of which are all incorporated herein by reference.

Other suitable cationic initiators can be used such as the phenyldiazonium hexafluorophosphates containing alkoxy or benzyloxy radicals as substituents on the phenyl radical as described in U.S. Pat. No. 4,000,115 at column 1, line 9 to column 3, line 41, "Photopolymerization Of Epoxides", by Sanford S. Jacobs issued Dec. 28, 1976, the specified disclosures of which are all incorporated herein by reference. Preferred cationic initiators for use in the compositions of this invention are the salts of Group VIA elements and especially the sulfonium salts, and also the Group VIIA elements, particularly the diaryl iodonium hexafluroantimonates. Particular cationic catalysts can include diphenyl iodonium salts of tetrafluoro borate, hexafluoro phosphate, hexafluoro arsenate, and hexafluoro antimonate; and triphenyl sulfonium salts of tetrafluoroborate, hexafluoro phosphate, hexafluoro arsenate, and hexafluoro antimonate.

The curable film-forming composition of the present invention may (optionally) further comprise a polyglycidyl ether, such as a diglycidyl ether and/or a triglycidyl ether. Higher polyglycidyl ethers also can be utilized. Polyhydric alcohols that may be used to prepare the polyglycidyl ether include, for example, ethylene glycol, propylene glycol, butylene glycol, 1,6-hexylene glycol, neopentyl glycol, diethylene glycol, glycerol, trimethylol propane, resorcinol, catechol, hydroquinone, and pentaerythritol. Examples of suitable polyglycidyl ethers can include resorcinol diglycidyl ether and trimethylolpropane triglycidyl ether. Combinations of polyglycidyl ethers are also suitable.

The curable compositions of the present invention can include a variety of optional ingredients and/or additives that are somewhat dependent on the particular application of the curable composition. For example, the composition may be tinted and contain a colorant. The curable film-forming compositions of the present invention are particularly suitable for tinting. Other optional ingredients include rheology control agents, surfactants, e.g., those commercially available under the tradename BYK, initiators, catalysts, cure-inhibiting agents, reducing agents, acids, bases, preservatives, free radical donors, free radical scavengers and thermal stabilizers, which adjuvant materials are known to those skilled in the art.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the compositions of the present invention.

Example colorants include pigments, dyes and tints, such as those listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing.

Example pigments and/or pigment compositions can include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Examples of suitable dyes can include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

The curable compositions of the present invention are especially suitable for use as curable coating compositions. In particular, the curable coating compositions are useful for coating articles such as optical articles where the curable coating compositions provide coated substrates, such as optical substrates having improved scratch resistance.

Thus, the present invention also is directed to an article comprising (a) a substrate, and (b) a coating over at least a portion of the substrate, wherein the coating is formed from any of the curable compositions previously described. In particular, the article is an optical article selected from the group consisting of windows, display elements, mirrors, lenses, active and passive liquid crystal cells, visors, and goggles. The curable composition of the present invention provides a coating on at least a portion of the optical substrate which provides improved scratch resistance. Therefore, the curable compositions of the present invention are especially suitable for application as scratch resistant coatings on lenses.

The curable compositions of the present invention can be applied as a coating to any suitable substrate. For example, the substrate can be a glass substrate, such as crown glass or other optical grade glass, or a plastic substrate, such as a thermoplastic or thermoset substrate comprised of a polymeric organic material.

Examples of suitable polymeric organic materials which may be used as substrates for the curable composition of the present invention can include polymers of bis(allyl carbonate)monomers, diethylene glycol dimethacrylate monomers, diisopropenyl benzene monomers, ethoxylated bisphenol A dimethacrylate monomers, ethylene glycol bismethacrylate monomers, poly(ethylene glycol)bismethacrylate monomers, ethoxylated phenol bismethacrylate monomers, alkoxylated polyhydric alcohol acrylate monomers, such as ethoxylated trimethylol propane triacrylate monomers, urethane acrylate monomers, such as those described in U.S. Pat. No. 5,373,033 at column 2, line 27 to column 9, line 10, the specified disclosure of which is incorporated by reference herein, and vinylbenzene monomers, such as those described in U.S. Pat. No. 5,475,074 at column 2, line 20 to column 4, line 2, the specified disclosure of which is incorporated by reference herein, and styrene; polymers, of mono-functional (meth)acrylate monomers, polyfunctional, e.g., di- or multi-functional, acrylate and/or methacrylate monomers, poly($C_1$-$C_{12}$ alkyl methacrylates), such as poly (methyl methacrylate), poly(oxyalkylene)dimethacrylate, poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), polyurethanes, polythiourethanes, thermoplastic polycarbonates, polyesters, poly(ethylene terephthalate), polystyrene, poly (alpha methylstyrene), copoly(styrene-methyl methacrylate), copoly(styrene-acrylonitrile), polyvinylbutyral; polymers of olefins, particularly cyclic olefins; polymers of epoxy and/or episulfide monomers; and polymers of diallylidene pentaerythritol, particularly copolymers with polyol (allyl carbonate)monomers, e.g., diethylene glycol bis(allyl carbonate), acrylate monomers, e.g., ethyl acrylate, butyl acrylate and mixtures thereof. Further examples of polymeric organic materials are disclosed in the U.S. Pat. No. 5,753,146, at column 8, line 62 to column 10, line 34, the specified disclosure of which is incorporated herein by reference.

Transparent copolymers and blends of transparent polymers are also suitable as substrates. The substrate for the curable composition can be an optically clear polymerized organic material prepared from a thermoplastic polycarbonate resin, such as the carbonate-linked resin derived from bisphenol A and phosgene, which is sold under the trademark LEXAN; a polyester, such as the material sold under the trademark MYLAR; a poly(methyl methacrylate), such as the material sold under the trademark PLEXIGLAS; polymerizates of a polyol(allyl carbonate)monomer, especially diethylene glycol bis(allyl carbonate), which monomer is sold under the trademark CR-39®, and polymerizates of copolymers of a polyol(allyl carbonate), e.g., diethylene glycol bis(allyl carbonate), with other copolymerizable monomeric materials, such as copolymers with vinyl acetate, e.g., copolymers of from 80 to 90 percent diethylene glycol bis(allyl carbonate) and 10 to 20 percent vinyl acetate, particularly 80 to 85 percent of the bis(allyl carbonate) and 15 to 20 percent vinyl acetate, and copolymers with a polyurethane having terminal diacrylate functionality, as described in U.S. Pat. No. 4,360,653 at column 3, line 55 to column 8, line 47, and U.S. Pat. No. 4,994,208 at column 4, line 15 to column 7, line 41, the specified disclosures of which are incorporated by reference herein; and copolymers with aliphatic urethanes, the terminal portion of which contain allyl or acryloyl functional groups, as described in U.S. Pat. No. 5,200,483 at column 4, line 66 to column 10, line 65, the specified disclosure of which is incorporated by reference herein; poly(vinyl acetate), polyvinylbutyral, polyurethane, polythiourethanes, polymers of members of the group consisting of diethylene glycol dimethacrylate monomers, diisopropenyl benzene monomers, ethoxylated bisphenol A dimethacrylate monomers, ethylene glycol bismethacrylate monomers, poly(ethylene glycol)bismethacrylate monomers, ethoxylated phenol bismethacrylate monomers and ethoxylated trimethylol propane triacrylate monomers; cellulose acetate, cellulose propionate, cellulose butyrate, cellulose acetate butyrate, polystyrene and copolymers of styrene with methyl methacrylate, vinyl acetate, acrylonitrile and mixtures thereof.

The substrate can comprise glass, polycarbonate, polyamide, polyurea, polyurethane, poly(urea)urethane, polythiourethane, polythio(urea)urethane, and/or polyol(allyl carbonate) materials, as well as episulfide-derived resin materials. Additionally, the substrate can be in the form of a film, such as a cast polymeric film, comprising cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polyurethane, polythiourethane, polycarbonate, copolymers thereof, and/or mixtures thereof.

Any of the previously described curable compositions of the present invention can be applied to the substrate using, for example, any conventional coating technique including flow coating, dip coating, spin coating, roll coating, curtain coating and spray coating. Coatings formed from the curable compositions of the present invention may range in thickness from 0.1 to 50 microns, such as from 1 to 20 microns, or from 2 to 10 microns, e.g., 5 microns.

Following application of the curable composition of the present invention to the substrate, the coating is cured. As used herein, the terms "cured" and "curing" refer to the at least partial crosslinking or polymerization of the components of the composition that are intended to be cured, i.e., cross-linked or polymerized. The coating can be thermally cured by exposing the coated substrate to elevated temperatures for a time sufficient to effect crosslinking or polymerization of the components. Also, the coating can be cured by irradiation with infrared, ultraviolet, visible or electron radiation. When a photoinitiator is present in the curable composition, a coated substrate may be irradiated with infrared, ultraviolet, visible or electron radiation at sufficient energy to activate the photoinitiator. This photopolymerization can occur as the sole curing method, or it may occur prior to or after thermally curing steps, or simultaneously during the thermal curing process. During the irradiation step, the coated substrate may be maintained at room temperature, e.g., 22° C. to 27° C., or it may be heated to an elevated temperature which is below the temperature at which damage to the substrate occurs.

The present invention relates for example, without being limited thereto, to the following aspects.

In a first aspect, the present invention relates to a curable composition comprising the following components:
  (i) a first alkoxysilane which is unhydrolyzed;
  (ii) a second alkoxysilane which is 5 to 45 percent hydrolyzed; and
  (iii) an ethylenically unsaturated monomer.

In a second aspect, the present invention relates to the curable composition as described in the first aspect wherein component (i) and component (ii) are prepared and added separately.

In a third aspect, the present invention relates to the composition as described in any one of the first or second aspects wherein component (ii) comprises at least 30 percent monomeric alkoxysilane.

In a fourth aspect, the present invention relates to the curable composition as described in any one of the first to the third aspects, wherein the first alkoxysilane (i) and the second alkoxysilane (ii) are the same or different.

In a fifth aspect, the present invention relates to the curable composition as described in any one of the first to the fourth aspects, wherein the first alkoxysilane and the second alkoxysilane each independently has the following structure (I):

$$R_xSi(OR')_{4-x} \quad (I)$$

wherein:
  x is 0, 1, 2, or 3;
  each R is an organic radical independently selected from $C_1$ to $C_6$ alkyl, vinyl, alkoxyalkyl, aryl, aryloxyalkyl, γ-glycidoxy alkyl, or γ-(meth)acryloxy alkyl; and
  each R' is independently a $C_1$ to $C_4$ alkyl group.

In a sixth aspect, the present invention relates to the curable composition as described in any one of the first to the fifth aspects, wherein the curable composition further comprises a free-radical initiator selected from the group consisting of thermal initiators, photoinitiators, and mixtures thereof.

In a seventh aspect, the present invention relates to the curable composition as described in the sixth aspect, wherein the free-radical initiator is a photoinitiator.

In an eighth aspect, the present invention relates to the curable composition as described in any one of the first to the seventh aspects wherein:
component (i) is present in the curable composition in an amount ranging from 5 to 90 weight percent;
component (ii) is present in the curable composition in an amount ranging from 5 to 90 weight percent; and
component (iii) is present in the curable composition in an amount ranging from 1 to 50 weight percent,
where weight percentages are based on the total weight of components (i), (ii), and (iii).

In a ninth aspect, the present invention relates to the curable composition as described in any one of the first to the eighth aspects, wherein each of the first alkoxysilane of component (i) and the second alkoxysilane of component (ii) is independently selected from the group consisting of methyl triethoxysilane, γ-glycidoxypropyl trimethoxysilane, tetramethoxysilane, tetraethoxysilane, acryloxysilane, and mixtures thereof.

In a tenth aspect, the present invention relates to the curable composition as described in any one of the fifth to the ninth aspects, wherein R is γ-glycidoxy alkyl and the curable composition further comprises a curing agent comprising a cationic initiator.

In an eleventh aspect, the present invention relates to the curable composition as described in any one of the first to the tenth aspects, wherein the curing agent comprises aryl onium salts of Group VA elements, salts of Group VIA elements, salts of Group VIIA elements, or mixtures thereof.

In a twelfth aspect, the present invention relates to the curable composition as described in any one of the first to the eleventh aspects, wherein the ethylenically unsaturated monomer of component (iii) is selected from the group consisting of hexanediol diacrylate, butanediol diacrylate, cycylohexane dimethanol divinylether, and mixtures thereof.

In a thirteenth aspect, the present invention relates to the curable composition as described in any one of the first to the twelfth aspects, wherein the second alkoxysilane of component (ii) is 10 to 40 percent hydrolyzed.

In a fourteenth aspect, the present invention relates to the curable composition as described in any one of the first to the thirteenth aspects, wherein the curable composition further comprises a polyglycidyl ether.

In a fifteenth aspect, the present invention relates to a coating formed from the curable composition as described in any one of the first to the fourteenth aspects.

In a sixteenth aspect, the present invention relates to an article comprising:
(a) a substrate; and
(b) a coating over at least a portion of the substrate, wherein the coating is formed from the curable composition as described in any one of the first through the fourteenth aspects.

In a seventeenth aspect, the present invention relates to the article as described in the sixteenth aspect, wherein component (ii) of the curable composition comprises at least 30 percent monomeric alkoxysilane.

In an eighteenth aspect, the present invention relates to the article as described in any one of the sixteenth or seventeenth aspects, wherein the substrate comprises glass, polycarbonate, polyamide, polyurea, polyurethane, poly(urea)urethane, polythiourethane, polythio(urea)urethane, polyol (allyl carbonate), and/or episulfide-derived resin materials.

In a nineteenth aspect, the present invention relates to the article as described in any one of the sixteenth to the eighteenth aspects, wherein the article is an optical article selected from the group consisting of windows, display elements, mirrors, lenses, active and passive liquid crystal cells, visors, and goggles.

In a twentieth aspect, the present invention relates to the article as described in any one of the sixteenth to the nineteenth aspects, wherein the article is a lens.

The present invention is more particularly described in the following examples, which are intended as illustrative only, since numerous modifications and variations therein will be apparent to those skilled in the art.

EXAMPLES

Example 1

Preparation of Hydrolysis Product 1: A partially hydrolyzed epoxy-functional alkoxysilane was prepared by charging 27.3 g of 3-glycidoxypropyltrimethoxysilane to a flask, and cooling to 5° C. in an ice bath. Then 2.7 g of a 0.055% HCl (aq) solution was added to the cooled 3-glycidoxypropyltrimethoxysilane and the ingredients were mixed for 30 minutes, during which time a peak exotherm of 15° C. was observed. The resulting hydrolysis product was stripped of volatiles under vacuum.

Comparative Example 2

Preparation of Hydrolysis Product 2: A partially hydrolyzed epoxy-functional alkoxysilane was prepared by combining 236 g of 3-glycidoxypropyltrimethoxysilane, 36 g of water, and 0.5 ml of a 1% HCl (aq) solution at room temperature and mixing for 16.25 hours, during which time a peak exotherm of approximately 45° C. occurred. The resulting hydrolysis product was stripped of volatiles under vacuum.

The Hydrolysis Product 1 (Example 1) and the Hydrolysis Product 2 (Comparative Example 2) were analyzed using Fourier-transform infrared (FTIR) spectroscopy to assess percent hydrolysis on the basis of hydrolyzable alkoxy groups (see Table 1 below). Theoretical percent hydrolysis is indicated in Table 1 for both the Hydrolysis Product 1 (of Example 1) and Hydrolysis Product 2 (of Comparative Example 2) based on the stoichiometric ratio of water to hydrolyzable alkoxy groups.

Figure 1:
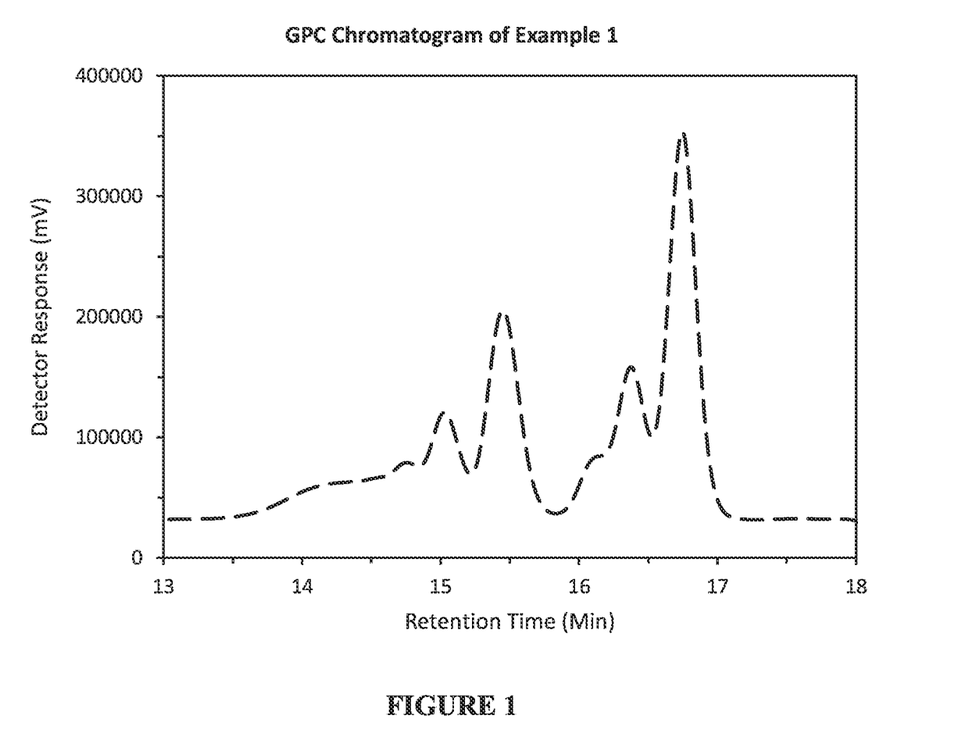
FIG. 1 depicts the gas permeation chromatogram of the product of Example 1 described herein below.
Figure 2:
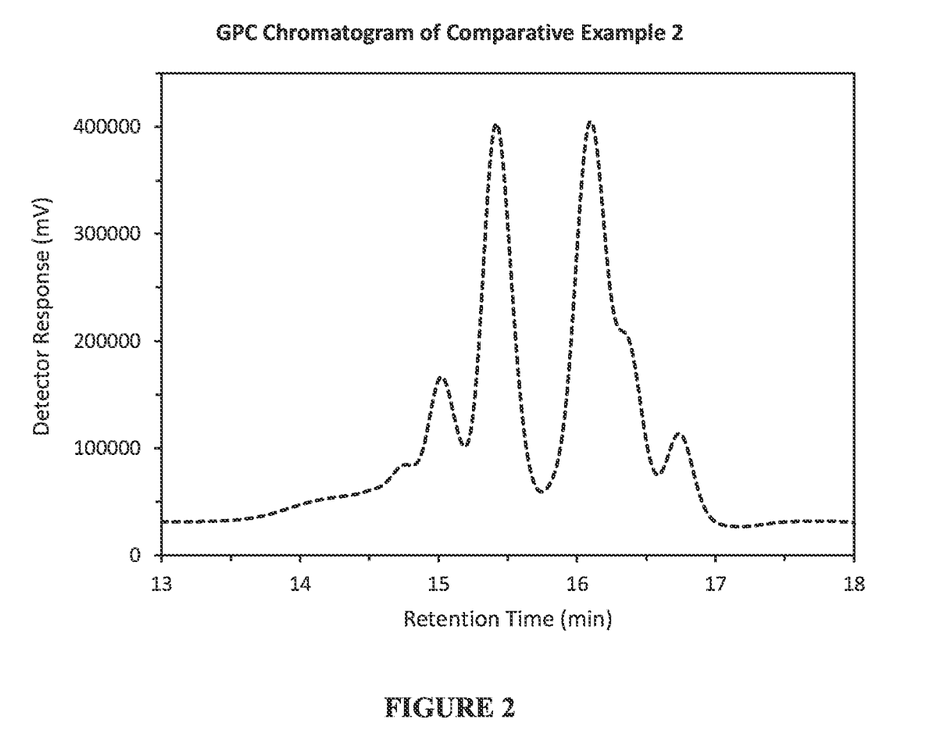
FIG. 2 depicts the gas permeation chromatogram of the product of Comparative Example 2 described herein below.
Figure 3:
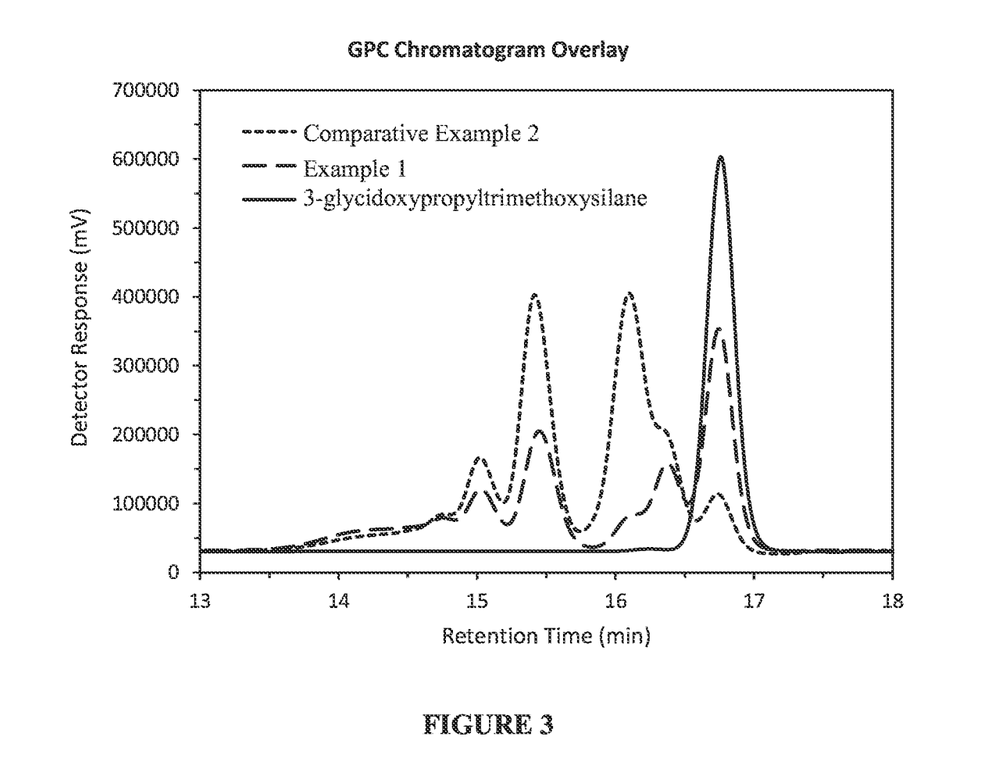
FIG. 3 depicts an overlay of the chromatograms of FIGS. 1 and 2 in relation to the gas permeation chromatogram of pure, unhydrolyzed 3-glycidoxypropyltrimethoxysilane as a reference sample.

The percent monomeric content (as defined herein) of both Example 1 and Comparative Example 2 products was also verified by GPC to demonstrate that the Example 1 product remains relatively uncondensed (see Table 1 below). The GPC chromatogram of Hydrolysis Product 1 (Example 1) is depicted in FIG. 1. The GPC chromatogram of Hydrolysis Product 2 (Comparative Example 2) is depicted in FIG. 2. A comparison of the respective GPC chromatograms demonstrates the difference in molecular weight distribution, representing the extent of hydrolyzed alkoxysilane condensation. For clarity, FIG. 3 depicts an overlay of the GPC chromatograms of FIGS. 1 and 2 in relation to the GPC chromatogram for a pure, unhydrolyzed 3-glycidoxypropyltrimethoxysilane reference sample.

To support the difference in percent monomeric content for the Hydrolysis Product 1 (Example 1) and the Hydrolysis Product 2 (Comparative Example 2) detected by GPC, $^{29}$Si nuclear magnetic resonance (NMR) measurements were performed to detect, on a molar basis, the relative fraction of completely unhydrolyzed 3-glycidoxypropyltrimethoxysilane species in the product (see Table 1). Importantly, $^{29}$Si NMR characterization quantifiably shows a high molar fraction of completely unhydrolyzed 3-glycidoxypropyltrimethoxysilane species in the Hydrolysis Product 1 (Example 1), as compared with the Hydrolysis Product 2 (Comparative Example 2) which is consistent with the molecular weight distribution characterized by GPC.

TABLE 1

|  | Example 1 (Hydrolysis Product 1) | Comparative Example 2 (Hydrolysis Product 2) |
|---|---|---|
| Theoretical Percent Hydrolysis | 40 | 67 |
| Percent Hydrolysis[1] | 30.8 | 62.3 |
| Percent Monomeric[2] | 35.0 | 5.9 |
| Percent Unhydrolyzed Alkoxysilane[3] | 40.0 | 8.7 |

[1]Fourier-transform infrared (FTIR) spectra were collected on a VERTEX 70 FTIR bench (Bruker Corp) using a PIKE MIRacle (PIKE Technologies) attenuated total reflectance (ATR) accessory with a diamond plate. The methoxy C—H stretch at 2840 cm$^{-1}$ was used to calculate percent hydrolysis. An unhydrolyzed sample of 3-glycidoxypropyltrimethoxysilane was used as the "0%" hydrolysis reference.
[2]GPC characterization was performed using a Waters 600E LC, Waters 2414 Refractive Index Detector, and a PerkinElmer TotalChrom C/S Chromatography Data System. The column set was 2x PL Gel 500 Å, 5 μm, 300 × 7.5 mm, in series with a mobile phase of 100% tetrahydrofuran (THF, stabilized with butylated hydroxytoluene); the gradient was isocratic, 25 minutes; the flow rate was 1.0 mL/min; the column/detector temperature was 35° C.; and the injection volume was 100 μL. The sample preparation was 100 mg/10 mL THF. The Mw reference standards were seven polyethylene glycol standards with Mw range 106-17,500. Example 1 and Comparative Example 2 products were analyzed under identical GPC conditions as described above. Pure, monomeric, unhydrolyzed 3-glycidoxypropyltrimethoxysilane was also analyzed by GPC to determine the retention time of monomeric material. The peak corresponding to the unhydrolyzed alkoxysilane reactant retention time was integrated on an area basis to give the relative amount of monomeric material.
Percent monomeric = [(integrated area, monomeric) ÷ (total area integrated)] × 100
[3]Unhydrolyzed alkoxysilane content was determined by $^{29}$Si NMR. $^{29}$Si NMR was carried out on a 500 MHz magnet with a carrier frequency of 99.4 MHz. Approximately 200 mg of sample was dissolved in CDCl$_3$. Chromium(III) acetylacetonate (Cr(AcAc)$_3$) dissolved in CDCl$_3$ was added to the sample to serve as a relaxation agent. The $^{29}$Si NMR spectra were recorded by acquiring 2048 scans with a 6-s recycle delay. A sample of pure unhydrolyzed 3-glycidoxypropyltrimethoxysilane was analyzed by $^{29}$Si NMR to determine the chemical shift of the unhydrolyzed material, which is approximately −42 ppm. This sample of unhydrolyzed 3-glycidoxypropyltrimethoxysilane was then compared to a samples of Example 1 and Comparative Example 2, in which there can be various states of hydrolysis. These different states of hydrolysis have $^{29}$Si resonances in the following regions: −72 to −63, −62 to −56, −52 to −47, −41 to −35, and −23 to −21 ppm. These chemical shift ranges may be integrated either with a single integration, or several integrations within the region. To calculate the relative molar percent of unhydrolyzed 3-glycidoxypropyltrimethoxysilane in the sample, the following equation was used:

$$\text{Percent Unhydrolyzed Alkoxysilane} = \frac{\sum \text{Integration of Unhydrolyzed}}{\sum \text{Integrations of Unhydrolyzed and Hydrolyzed}}$$

Example 3

Preparation of Coating Compositions: Four coating compositions, respectively labeled as Coating A, Comparative Coating B, Coating C, and Comparative Coating D in Table 2 below, were prepared by blending the indicated ingredients, with the amounts being given in parts by weight. The compositions were spin coated onto lenses prepared from CR-39® monomer (commercially available from PPG Industries, Inc.) and cured using a "D"-type ultraviolet curing lamp (300 W/in; 4.1 J/cm$^2$ UVA, measured using a EIT® UV Power Puck® II).

The resulting coated substrates were tested for surface abrasion resistance with a Bayer Abrasion Tester. The resistance of the coated substrate to abrasion was quantified by measuring the haze of the test sample after abrasion and comparing that value to that measured on a control sample, i.e., a plano lens prepared from CR-39® monomer. Measurements were made on multiple pairs of test sample/controls, e.g., 5 pairs, to ensure statistically significant results. The samples and controls to be tested were cleaned with mild soapy water, rinsed with water and then dried with air. The test samples and controls were conditioned for approximately 2 hours. The percent haze of the test sample and control was measured using an UltraScan Pro spectrophotometer (HunterLab). The test sample and control were mounted on the Bayer Abrader and the abrasion medium was placed in the pan of the Abrader. The Abrader was operated for 4 minutes at a rate of 150 cycles per minute for a total of 600 cycles. Both the test samples and controls were cleaned with mild soapy water, rinsed and dried with air. The haze of the test samples and controls were again measured using the UltraScan Pro spectrophotometer. The Haze Gain was calculated from the difference in haze before and after abrading. The reported Bayer Ratio was calculated by dividing the measured haze of the control by that of the test sample, i.e., Bayer Ratio=Haze Gain (control)/Haze Gain (test sample).

TABLE 2

|  | Coating Compositions | | | |
|---|---|---|---|---|
| Component | A | Comparative B | C | Comparative D |
| Hydrolysis Product 1 (Example 1) | 9.828 | — | 5.495 | — |
| Hydrolysis Product 2 (Comparative Example 2) | — | 9.825 | — | 5.516 |
| 3-Glycidoxypropyl-trimethoxysilane | 13.313 | 13.301 | 5.002 | 4.997 |
| Hexanediol diacrylate | 4.915 | 4.902 | — | — |
| Butanediol diacrylate | — | — | 7.998 | 7.999 |
| 2-Hydroxy-2-methylpropiophenone | 1.123 | 1.133 | 1.122 | 1.171 |
| Diphenyliodonium hexafluorophosphate | 1.958 | 1.968 | 1.957 | 1.962 |
| BYK-307[1] | 0.145 | 0.156 | 0.139 | 0.166 |
| Cyclohexane dimethanol divinylether | — | — | 2.005 | 2.013 |
| Trimethylolpropane triglycidyl ether | — | — | 7.497 | 7.501 |
| Bayer Ratio (vs. uncoated CR-39 ®) | 5.53 | 1.83 | 3.08 | 1.98 |

[1]A silicone-containing surface additive available from BYK.

The results presented above in Table 2 clearly demonstrate the improvement in scratch resistance, as evidenced by improved Bayer Ratio for in the inventive Coating Compositions A and C as compared to the Comparative Coating Compositions B and D with higher hydrolysis levels and lower monomeric alkoxysilane compositions.

It will be readily appreciated by those skilled in the art that modifications, as indicated above, may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:
1. A curable composition comprising the following components:
(i) a first alkoxysilane which is unhydrolyzed, present in the curable composition in an amount ranging from 10 to 80 weight percent;
(ii) a second alkoxysilane which is 5 to 45 percent hydrolyzed, present in the curable composition in an amount ranging from 5 to 90 weight percent; and
an ethylenically unsaturated monomer, present in the curable composition in an amount ranging from 1 to 50 weight percent; wherein weight percentage is based on the total weight of components (i), (ii), and (iii).

2. The curable composition of claim 1, wherein component (i) and component (ii) are prepared and added separately.

3. The curable composition of claim 1, wherein component (ii) comprises at least 30 percent monomeric alkoxysilane.

4. The curable composition of claim 1, wherein the first alkoxysilane and the second alkoxysilane are the same or different.

5. The curable composition of claim 1, wherein the first alkoxysilane and the second alkoxysilane each independently has the following structure (I):

$$R_xSi(OR')_{4-x} \qquad (I)$$

wherein:
x is 0, 1, 2, or 3;
each R is an organic radical independently selected from $C_1$ to $C_6$ alkyl, vinyl, alkoxyalkyl, aryl, aryloxyalkyl, γ-glycidoxy alkyl, or γ-(meth)acryloxy alkyl; and
each R' is independently a $C_1$ to $C_4$ alkyl group.

6. The curable composition of claim 1, further comprising a free-radical initiator selected from the group consisting of thermal initiators, photoinitiators, and mixtures thereof.

7. The curable composition of claim 6, wherein the free-radical initiator is a photoinitiator.

8. The curable composition of claim 1, wherein each of the first alkoxysilane of component (i) and the second alkoxysilane of component (ii) is independently selected from the group consisting of methyl triethoxysilane, γ-glycidoxypropyl trimethoxysilane, tetramethoxysilane, tetraethoxysilane, acryloxysilane, and mixtures thereof.

9. The curable composition of claim 5, wherein R is γ-glycidoxy alkyl and the curable composition further comprises a curing agent comprising a cationic initiator.

10. The curable composition of claim 9, wherein the curing agent comprises aryl onium salts of Group VA elements, salts of Group VIA elements, salts of Group VIIA elements, or mixtures thereof.

11. The curable composition of claim 1, wherein the ethylenically unsaturated monomer of component (iii) is selected from the group consisting of hexanediol diacrylate, butanediol diacrylate, cycylohexane dimethanol divinylether, and mixtures thereof.

12. The curable composition of claim 1, wherein the second alkoxysilane of component (ii) is 10 to 40 percent hydrolyzed.

13. The curable composition of claim 1, further comprising a polyglycidyl ether.

* * * * *